Sept. 1, 1925.
B. A. BENSON
BRACKET FOR LAMPS
Filed Nov. 13, 1924
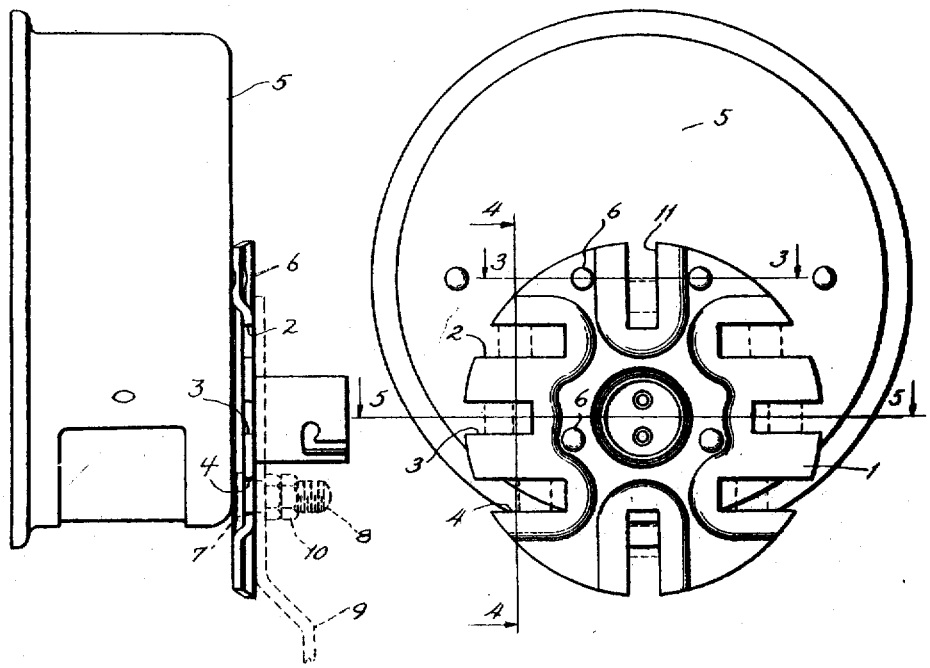
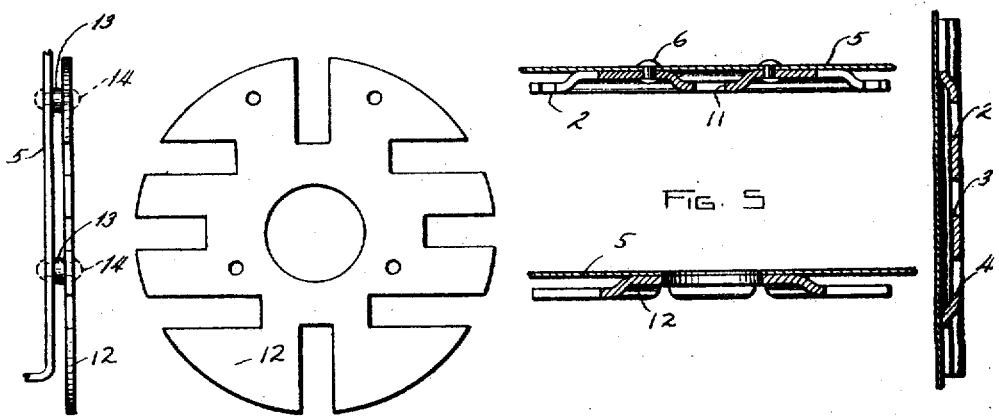
INVENTOR:
Bernhart A. Benson
by Albert Schuth,
ATTY.

Patented Sept. 1, 1925.

1,551,533

UNITED STATES PATENT OFFICE.

BERNHART A. BENSON, OF CHICAGO, ILLINOIS, ASSIGNOR, BY MESNE ASSIGNMENTS, TO CHICAGO ELECTRIC MANUFACTURING COMPANY, OF CHICAGO, ILLINOIS, A CORPORATION OF ILLINOIS.

BRACKET FOR LAMPS.

Application filed November 13, 1924. Serial No. 749,669.

*To all whom it may concern:*

Be it known that I, BERNHART A. BENSON, citizen of the United States, residing at Chicago, in the county of Cook and State of Illinois, have invented certain new and useful Improvements in a Bracket for Lamps; and I do hereby declare the following to be a full, clear, and exact description of the invention, such as will enable others skilled in the art to which it appertains to make and use the same.

My invention relates to means for supporting lamps through bolts, and more particularly to the providing of supporting means whereby lamps may be secured to supports interchangeably by bolts of different spacing and different relative location.

In constructing automobiles, it has been the custom of the car manufacturers to provide suitably located bolt holes on certain parts of the vehicle so as to facilitate the fastening of lamps so the same. However, neither the lamps furnished as standard equipment by different automobile manufacturers, nor the brackets employed for supporting such lamps have been standardized. Consequently, the car owner who wishes to substitute a lamp of some other make, must be particular to have this lamp provided with attaching means spaced according to the bolt holes in the lamp bracket on his car, or else must go to the expense of having new and differently spaced holes drilled in this bracket.

As for the manufacturers of automobile lamps, and particularly the class of lamps commonly employed for the tail light and stop signal indications, it has long been their custom to provide such lamps with bolts extending rearwardly through the back of the lamp casing, which bolts cannot be changed as to their spacing, and hence usually only fit a small portion of the supporting means provided on various cars. To make them fit others, it has heretofore been necessary to interpose a bracket provided with one set of holes corresponding to the spacing of the bolts on the lamp and with another set of holes corresponding to the spacing on the lamp-supporting portion of the car. This requires both the lamp manufacturer and the dealer to carry a variety of such brackets in stock and leads to many complaints and difficulties in case the customer has not specified the exact spacing provided for the attaching bolts on his car.

My present invention aims to overcome these difficulties and annoyances by providing the lamp casing with an attaching member arranged for interchangeably receiving the attaching bolts with various spacings of the latter, so that a lamp when thus equipped can be attached interchangeably to the widely varying supports provided for this purpose on different makes of automobiles. Furthermore, my invention provides an arrangement for this purpose which will not leave openings in the lamp casing through which dust can enter the casing, and which will automatically hold the attached bolts against rotation. It also provides an arrangement for this purpose which can be employed with substantially equal facility either with the attaching bolts spaced laterally of each other or with these bolts disposed one above the other. Still further and also more detailed objects will appear from the following specification and from the accompanying drawings, in which:

Fig. 1 is a side elevation of the casing of a modern type of rear lamp for automobile use, showing this as secured to a supporting bracket through an attaching member embodying my invention.

Fig. 2 is a rear view of the lower portion of the lamp casing with the slotted attaching member of my invention attached to the same.

Figs. 4–5 are sections taken through this attaching member respectively along the correspondingly numbered lines of Fig. 2.

Fig. 6 is a side view of a rear portion of a lamp casing, and of attaching means secured to the same and embodying my invention, showing the attaching means as comprising a flat attaching plate in combination with spacing washers.

Fig. 7 is a rear elevation of the attaching plate of Fig. 6.

In constructing rear lamps of this general class, it has heretofore been customary for the lamp manufacturer to provide each lamp with a pair of attaching bolts which project through the back of the lamp casing from the interior of the latter and which have their shanks rigidly secured to the lamp casing to prevent rotation. Instead of following this practice, which employs a definite spacing between the attaching bolts, I secure to the casing an attaching member which is desirably made of sheet steel and which is provided with a plurality of pairs of slots adapted to receive portions of the shanks of the attaching bolts, space being also provided in front of the adapter for the head of the bolt. Then I desirably employ bolts of the type having squared shank portions interposed between the threaded shank portions and the head of the bolt, the squared shank portions being slightly smaller in diameter than the width of the slots in my adapter, so that these squared shank portions will be engaged by the side walls of the slot to prevent the bolts from turning.

Illustrative of this arrangement, the drawings show the use of an attaching member in the form of a disk of sheet metal provided with a number of pairs of notches, these being arranged so that the notches of each pair extend in alinement with each other and open in opposite directions. Thus, Fig. 2 shows the metal disk 1 as having three pairs of oppositely open lateral notches or slots respectively numbered as 2, 3 and 4. These slots all have parallel horizontal side walls and each slot is preferably of the same width, namely a width slightly larger than the squared shank portion of a bolt of the size corresponding to the perforations commonly provided in the lamp-supporting brackets on automobiles by the car builders.

The attaching member as thus slotted is rigidly fastened to the back of the lamp casing 5 by any suitable means, as for example by rivets 6 extending through the original flat portion of the disk from which the adapter is formed. However, the metal portions surrounding each slot are offset rearwardly from this original flat portion which bears flatwise against the back of the lamp casing, so as to provide a space slightly greater than the thickness of the head 7 of one of the bolts. Since each slot is open at the edge of the attaching member, the head of a bolt can readily be slid behind the metal adjacent to the walls of that slot with a part of the squared shank portion laterally housed by the slot and with the threaded bolt shank 8 projecting rearwardly beyond the attaching member as shown in Fig. 1. When two bolts as thus extending through the oppositely open slots of one pair have been slid to correspond to the spacing of the holes in the support provided on the car for the lamp, each bolt can readily be secured to this support (such as the supporting bracket 9 of Fig. 1) by nuts 10.

By providing pairs of slots which approach each other to varying extents, I can readily employ the same adapter with bolts of considerably different spacing, as indicated for example by the various positions of the squared bolt shank parts which are shown in dotted lines in Fig. 2. Moreover, by providing such pairs of horizontally extending slots at different heights, I can also vary the height of the lamp to some extent with respect to the vehicle, this being sometimes desirable in order to secure a proper illumination of the rear license plate which is commonly supported below such a lamp.

However, I do not wish to be limited to the use of slots arranged for a horizontal spacing of the attaching bolts, as these bolts are sometimes disposed one above the other. Hence I desirably also provide a pair of vertical slots 11 as shown in Fig. 2. Neither do I wish to be limited to the details of the construction and arrangement thus disclosed, it being obvious that this might be varied in many respects without departing either from the spirit of my invention or from the appended claims. For example, instead of forming the slotted attaching member with portions directly engaging the back of the lamp casing (through which portions the rivets 6 extend) and arching the slotted parts of this member away from the back of the lamp casing, I may employ a flat slotted disk 12 (as shown in Figs. 6 and 7) in combination with washers 13 disposed between this flat disk and the back of the lamp casing and through which the securing rivets 14 extend.

I claim as my invention:—

1. The combination with a lamp casing, of an attaching member secured thereto and provided with a plurality of pairs of slots of equal width, the slots of each pair being in alinement, and a pair of bolts having their shanks projecting respectively through the slots comprising one pair, the parts of the supporting member adjacent to the slots being spaced from the lamp casing to permit the insertion and sliding of the bolt heads between these parts of the casing, the casing bearing directly against the parts of the attaching member through which it is secured to the latter.

2. The combination with a lamp casing having a flat back, of an attaching member secured to the said back and provided with a plurality of pairs of slots of equal width, the slots of each pair being in alinement, and a pair of bolts having their shanks projecting respectively through the slots comprising one pair, each slot having an entrance opening at one edge of the supporting member, the parts of the attaching member adjacent to each slot being substantially parallel to the back of the casing but spaced from the said back to permit the slidable inserting and movement of the bolt heads between these parts and the back of the casing.

3. The combination with the lamp casing having a flat back, of an attaching member having portions in flatwise engagement with the said back, and having other portions arched away from the said back to provide parts disposed in substantially a common plane spaced from the said back, the attaching member having a plurality of slots of equal width formed in the parts thus spaced from the said back, the slots being arranged in pairs with the slots of each pair in alinement and with entrance openings for the slots of each pair at their oppositely directed ends; means securing the first named portions of the attaching member to the said back of the casing; and a pair of bolts each having a head adapted to be slidably inserted between one of the said spaced parts and the back of the casing, and a shank adapted to be slid into the slot in that spaced part, each bolt shank having adjacent to its head a laterally flattened shank portion of a thickness closely approaching the width of one of the slots.

4. The combination with a lamp casing, of an attaching member secured thereto and provided with two parallel pairs of slots of equal width, the slots of each pair being in alinement and having inner ends differently spaced in one pair from their spacing in the other pair, and a pair of bolts having their shanks projecting respectively through the slots comprising one pair, the supporting member and the bolts having cooperating formations for preventing the bolts from rotating, each slot being open at its other end to permit the slidable insertion of the corresponding bolt after the attaching member is secured to the lamp casing.

Signed at Chicago, Illinois, November 10th 1924.

BERNHART A. BENSON.

having a flat back, of an attaching member having portions in flatwise engagement with the said back, and having other portions arched away from the said back to provide parts disposed in substantially a common plane spaced from the said back, the attaching member having a plurality of slots of equal width formed in the parts thus spaced from the said back, the slots being arranged in pairs with the slots of each pair in alinement and with entrance openings for the slots of each pair at their oppositely directed ends; means securing the first named portions of the attaching member to the said back of the casing; and a pair of bolts each having a head adapted to be slidably inserted between one of the said spaced parts and the back of the casing, and a shank adapted to be slid into the slot in that spaced part, each bolt shank having adjacent to its head a laterally flattened shank portion of a thickness closely approaching the width of one of the slots.

4. The combination with a lamp casing, of an attaching member secured thereto and provided with two parallel pairs of slots of equal width, the slots of each pair being in alinement and having inner ends differently spaced in one pair from their spacing in the other pair, and a pair of bolts having their shanks projecting respectively through the slots comprising one pair, the supporting member and the bolts having cooperating formations for preventing the bolts from rotating, each slot being open at its other end to permit the slidable insertion of the corresponding bolt after the attaching member is secured to the lamp casing.

Signed at Chicago, Illinois, November 10th 1924.

BERNHART A. BENSON.

DISCLAIMER.

1,551,533.—*Bernhart A. Benson*, Chicago, Ill. BRACKET FOR LAMPS. Patent dated September 1, 1925. Disclaimer filed April 7, 1927, by the patentee, assignee by mesne assignments, *Chicago Electric Manufacturing Company*, consenting.

Hereby enters the following disclaimer, namely: that he disclaims from the scope of claim 1 of the said Letters Patent No. 1,551,533 any embodiment of that claim in which the slots in the attaching member do not have entrance openings at the outer peripheral edge of the attaching member.

[*Official Gazette April 26, 1927.*]

DISCLAIMER.

1,551,533.—*Bernhart A. Benson*, Chicago, Ill. BRACKET FOR LAMPS. Patent dated September 1, 1925. Disclaimer filed April 7, 1927, by the patentee, assignee by mesne assignments, *Chicago Electric Manufacturing Company*, consenting.

Hereby enters the following disclaimer, namely: that he disclaims from the scope of claim 1 of the said Letters Patent No. 1,551,533 any embodiment of that claim in which the slots in the attaching member do not have entrance openings at the outer peripheral edge of the attaching member.

[*Official Gazette April 26, 1927.*]